March 13, 1934.　　　C. A. CAMPBELL　　　1,951,083
AIR BRAKE
Filed Sept. 4, 1931　　　8 Sheets-Sheet 4

March 13, 1934.  C. A. CAMPBELL  1,951,083
AIR BRAKE
Filed Sept. 4, 1931    8 Sheets-Sheet 6

Inventor
Charles G. Campbell
By Dodge and Sons
Attorneys

March 13, 1934.  C. A. CAMPBELL  1,951,083
AIR BRAKE
Filed Sept. 4, 1931    8 Sheets-Sheet 7

Inventor
Charles A. Campbell
By
Attorneys

March 13, 1934.  C. A. CAMPBELL  1,951,083
AIR BRAKE
Filed Sept. 4, 1931  8 Sheets-Sheet 8

Inventor
Charles A. Campbell
By Dodge and Dodge
Attorneys

Patented Mar. 13, 1934

1,951,083

UNITED STATES PATENT OFFICE

1,951,083

AIR BRAKE

Charles A. Campbell, Watertown, N. Y., assignor to The New York Air Brake Company, a corporation of New Jersey Application September 4, 1931, Serial No. 561,288

20 Claims. (Cl. 303—14)

This invention relates to air brakes, and particularly to double-heading cocks. While the invention (or certain features thereof) is generally applicable, the double-heading cock herein described and claimed develops particular utility in double end service, and will be described as so applied.

In double end service, two brake valve pedestals are used, one at each end of the locomotive. Each pedestal is complete and includes, as usual heretofore, an engineer's brake valve of the equalizing discharge type, an independent brake valve, a relay brake pipe vent valve, a feed valve for the automatic brake system, a reducing valve (feed valve) common to the signal system and the independent brake valve, and a double-heading cock.

In double end service as heretofore developed, two distributing valves of the type including an application portion and an equalizing portion, are used, each directly associated with a corresponding brake valve pedestal, and each provided with a so-called transfer valve which is controlled by the double-heading cock. When the transfer valve is "inactive" its distributing valve is under control of said corresponding pedestal, but when the transfer valve is "active" control is transferred to the other pedestal (i. e. the one at the other end of the locomotive).

The double-heading cock heretofore used with such systems was of the plug cock type and had three positions. It controlled the connection of the brake pipe with the engineer's brake valve and controlled the condition of the corresponding transfer valve. It had three positions; namely, position 1 which placed the pedestal in active control; position 2, used on the rear pedestal of a leading engine or single unit engine and on both ends of other than leading engines in multiple heading and on one end of an engine hauled dead; and position 3, used on the leading end of locomotives hauled dead in a train.

Position 3 in prior art devices is effective only in conjunction with a separate fixture known as the dead engine fixture.

The present invention improves the construction of three-position double-heading cocks and incorporates additional functions greatly simplifying manipulation when setting double end units, for either direction of running, for single or multiple heading, and for hauling dead in a train. It possesses other advantages and may be applied with modifications to other classes of service.

The strictly structural improvement arises primarily from the substitution of a rotary disc valve for the plug cock. This is made possible by the provision of means to ensure sufficient air pressure on top of the valve disc to maintain the valve disc seated in all positions and under all conditions. The difficulty in accomplishing this arises, in part, from the fact that the main reservoir of an engine hauled dead in a train is fed from the brake pipe and is charged to a pressure less than brake pipe pressure so that the pressure relation is then the reverse of that normally existing.

The double-heading cock herein disclosed controls connection of the brake valve with the brake pipe, and controls the transfer valve, as heretofore. In addition it controls the signal system (cutting this off from the reducing valves in those pedestals whose double-heading cocks are in positions 2 and 3) and includes the function of the hitherto separate dead engine fixture (providing a controlled feed from the brake pipe to the main reservoir in position 3). The disc valve itself in conjunction with check valves controls ports which admit the necessary seating pressure to the top of the disc valve, under the various conditions encountered when in its three different positions.

The preferred embodiment of the invention as applied to double end service is illustrated in the accompanying drawings, in which:—

Figs. 8 to 19 show the valve as actually constructed and ported, and disclose the preferred practical embodiment of the invention.

Figure 3:
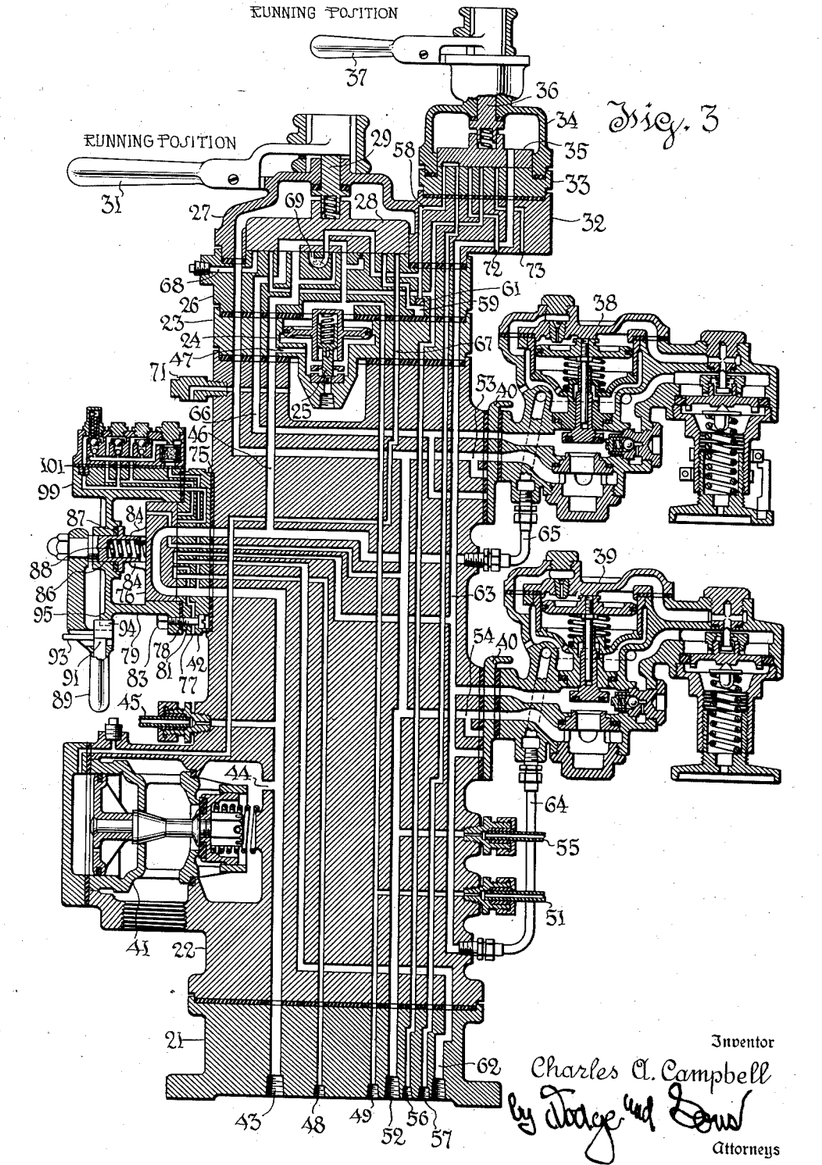
Fig. 3 is a vertical section through a brake valve pedestal equipped with a double-heading cock according to the present invention. The showing is diagrammatic to the extent that all ports are shown in a single plane. The engineer's brake valve (automatic) and the independent brake valve are each in running position and the double-heading cock is in position 1.

Referring first to Fig. 3, 21 represents an adapter base to which pipe connections are made through the floor of the locomotive cab. 22 is the pedestal. The porting of the pedestal will be described hereinafter. 23 indicates the equalizing portion of the engineer's brake valve. This portion contains the usual equalizing discharge piston 24 and equalizing discharge valve 25. 26 indicates the valve seat portion and 27 the cap portion.

The rotary valve appears at 28 and is actuated by a stem or key 29 and brake valve handle 31. The cap portion 27 carries, in the form of a lateral extension, a ported base or bracket 32 for the independent brake valve. Mounted on this is the valve seat portion 33 of the independent brake valve, and this is surmounted by a cap portion 34. The rotary valve appears at 35, the actuating stem at 36, and the independent brake valve handle at 37.

Mounted on the right side of the pedestal 22 (as viewed in Fig. 3), are two feed valves 38 and 39, which may be of any suitable type, but are illustrated as of the type described in the patent to Campbell, No. 1,781,747, November 18, 1930. They are both mounted on adapters 40 of the type described and claimed in the patent to Campbell, No. 1,752,631, April 1, 1930. Reference may be had to these patents for further details of construction and operation, but these details need not be set forth here as they are not material to the present invention.

The upper feed valve 38 is the feed valve for the automatic brake system. The lower valve 39 is the so-called "reducing valve" (feed valve) for the independent brake valve and for the pneumatic signal system.

Mounted on the left hand side of the pedestal near the base is a relay vent valve 41 of known construction. As devices of this sort are familiar to persons skilled in the art, and as its presence and operation are not features of the invention, a detailed statement of the construction and operation of this vent valve is deemed unnecessary. Generally stated, the valve is forced open by main reservoir air admitted against its piston through the engineer's brake valve when in emergency position, and functions to vent the brake pipe to atmosphere.

At the left hand side of the pedestal 22 immediately above the relay vent valve is the combined double-heading cock, dead engine fixture, and signal fixture, forming the subject matter of the present application. For the present it may be identified by the numeral 42 applied to its seat member, which together with the entire double-heading cock is removable from the pedestal 22. It will later be described in detail.

All the parts so far described, with the exception of the double-heading cock, are of standard construction and familiar to those skilled in the art. To assist in an understanding of the invention, the porting will be very briefly described, it being understood that the porting and equipment of the pedestal are subject to considerable variation, and that the purpose in illustrating the pedestal is merely to show one useful application of the double-heading cock, and offer a basis for disclosure of its operative characteristics.

The brake pipe port is indicated by the numeral 43. This port extends upward through the adapter 21 and pedestal 22. It has a branch (discharge) connection at 44 with the vent valve portion of the relay vent valve 41 and a branch connection 45 for the brake pipe pressure gauge. The passage 43 terminates in the face of the seat 42 of the double-heading cock.

The brake valve port 46 leads from the face of seat 42 and terminates in two ports in the seat of rotary valve 28. It also has a branch connection at 47 to the space below the equalizing piston 24, and a branch leading to the control pipe 65 of the feed valve 38.

The transfer valve port 48 leads from the face of valve seat 42 to the bottom of the adapter 21. The equalizing reservoir port 49, leading from the space above the equalizing piston 24, has two branches terminating in the seat of valve 28, and also extends downward to the bottom of the adapter 21 where it is connected to the usual equalizing reservoir (not shown). The equalizing reservoir gauge connection is shown at 51.

The main reservoir passage 52 extends from the bottom of the adapter 21 upward through the pedestal 22 and parts 23 and 26 to the space within the cap 27 above the rotary valve 28. It has an extension terminating in the face of the seat 42. There is a branch 53 to the inlet of the feed valve 38 and another branch 54 to the inlet of the feed valve 39. There is a main reservoir gauge connection 55.

The application port 56 extends from the bottom of the adapter 21 upward through the pedestal 22 and associated parts to the seats of the rotary valves 28 and 35.

The distributing valve release port 57 extends from the bottom of the adapter 21 upward through the pedestal 22 and associated parts and terminates in the seat of the rotary valve 35. A port 58 leads from the seat of the rotary valve 35 to the seat of the rotary valve 28. There is a second passage leading to the seat of the rotary valve 28 which is indicated at 59 and which is isolated by removable plug 61 from the passage 58. The presence or absence of this plug controls the function of the engineer's brake valve in holding position, this being a known expedient.

A signal passage 62 leads from the bottom of the adapter 21 upward through the pedestal 22 and terminates on the face of the seat 42. Also terminating in this seat is a reducing valve connection 63. This terminates at its upper end in the seat for the rotary valve 35 to which it supplies air, and also is connected with the discharge side of the reducing valve (feed valve) 39. This port 63 also communicates through the control pipe 64 with the control chamber of reducing valve 39.

The discharge side of the feed valve 38 is connected by the passage 66 with the seat of the rotary valve 28. A port 67 leads from the seat of the rotary valve 28 to the space to the left of the piston forming part of the vent valve 41. Passage 68 leads from the seat of the rotary valve 28, and if a duplex governor top is used, the low pressure top is connected to this passage. In the drawings the passage 68 is shown plugged.

The port 69 in the seat of the rotary valve 28 is an exhaust port. The part 71 is the discharge fitting of the equalizing discharge valve. The port 72 in the seat of the independent brake valve is an exhaust port and the port 73 is the warning port.

Only a part of the porting of the rotary valves 28 and 35 can be shown in the drawings, but it will be understood that these valves are of known type. Each is shown in the running position.

The pedestal and its porting, as above described, conform to known practice and the operation of the various parts will be readily understood by those skilled in the art. The only departure from prior standard practice is that heretofore the signal passage 62 has been directly connected with the feed valve passage 63. In the present instance, these two ports terminate in the seat 42 of the double-heading valve and are connected and disconnected by the double-heading valve. Consequently it is unnecessary to use an external signal fixture cock as was the universal practice heretofore. The construction of the double-heading cock will now be explained.

The valve seat member 42 is mounted against a recessed face formed in the side of the pedestal 22 to receive it. The ports 43, 48, 62, 63, 52, and 46, as heretofore described, all lead to this face.

A ported gasket 75 is interposed between valve seat member 42 and the mounting face in the pedestal 22. The valve seat is formed with continuations of the ports above specified, and each of these ports terminates in the seat on which the rotary valve 76 is mounted.

Figures 4, 5, 6:
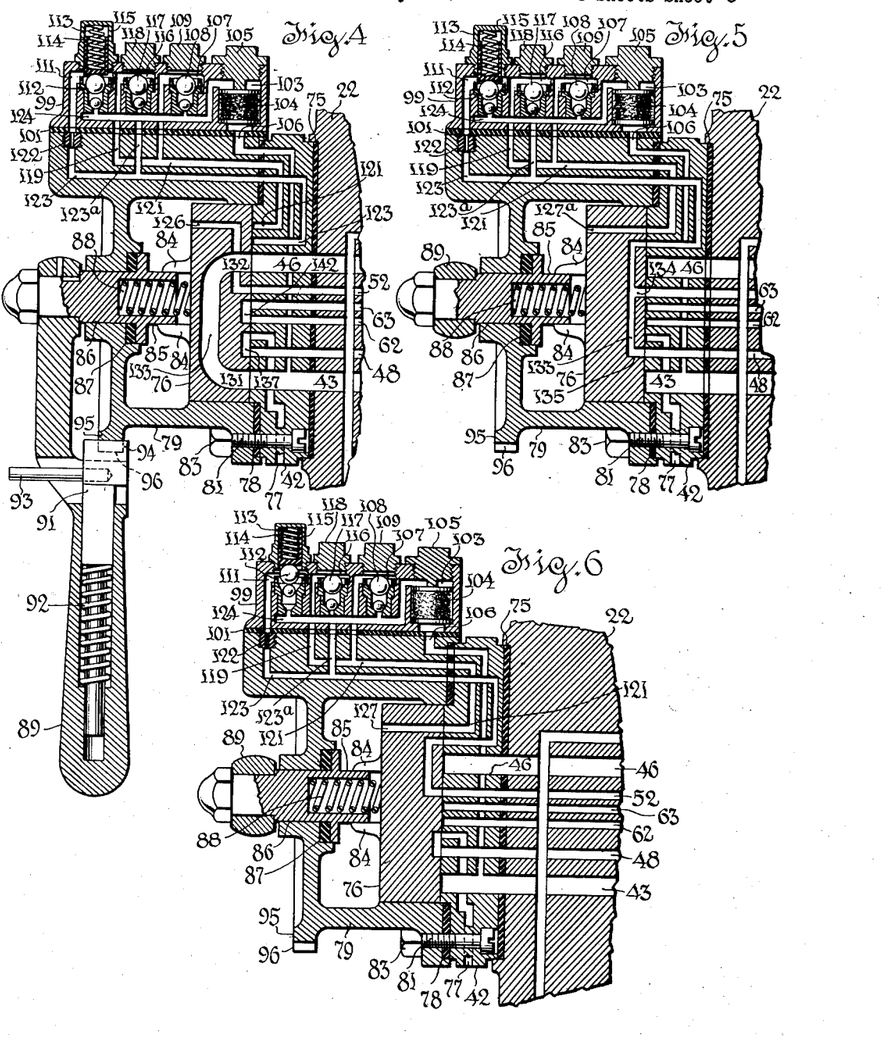
Fig. 4 is an enlarged view of the double-heading cock in position 1. The porting is diagrammatic as shown in Fig. 3.
Fig. 5 is a similar view showing port relations in position 2.
Fig. 6 is a similar view showing port relations in position 3.

In addition, there is an exhaust port 77 which leads from the face of the valve seat to atmosphere, as indicated in diagram in Figs. 4 to 6. In the preferred actual construction this port is at the center of the valve seat (see Fig. 13). The seat face is raised above the peripheral portion of the seat member 42. This peripheral portion receives a suitably ported gasket 78 against which is mounted the cap portion 79. This cap portion confines the rotary valve 76 and encloses a space within which fluid pressure is exerted against the back or inactive face of the rotary valve.

Figure 7:
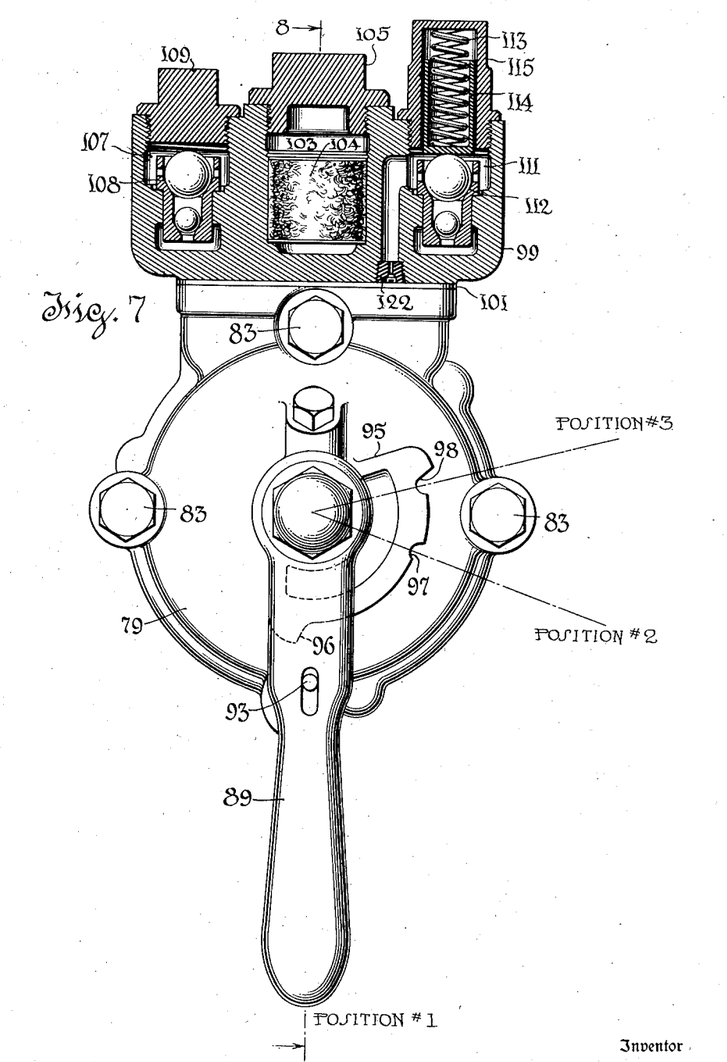
Fig. 7 is a front elevation of the cock as actually constructed. Position 1 is shown, but positions 2 and 3 are indicated.
Figure 13:
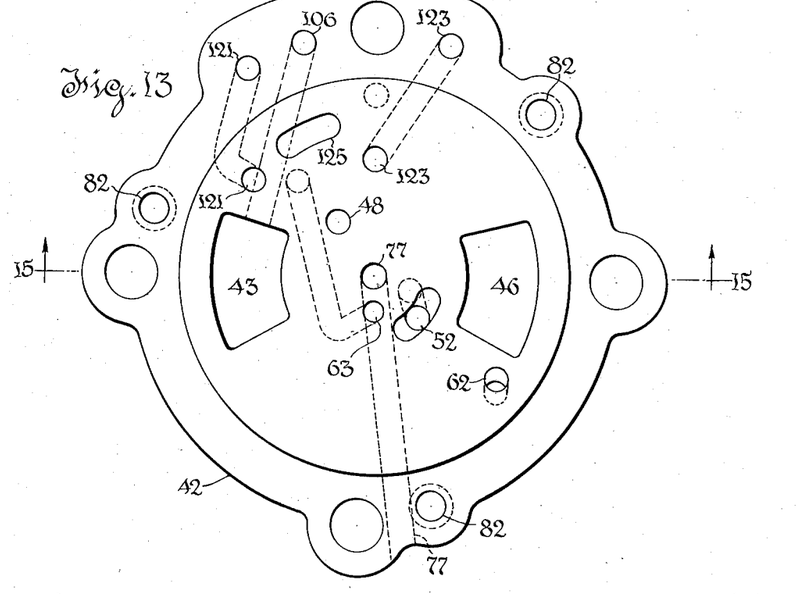
Fig. 13 is a face view of the seat for the rotary double-heading valve.
Figure 14:
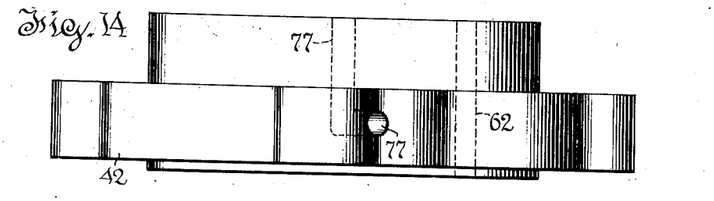
Fig. 14 is a side elevation thereof.
Figure 15:
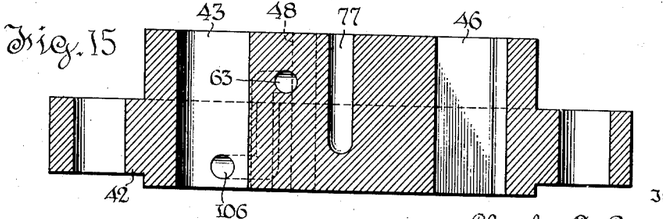
Fig. 15 is a section on the line 15—15 of Fig. 13.

The seat 42 and cap member 79 are connected by three machine screws 81, one of which appears in diagram in Figs. 4 to 6, and the holes for which appear at 82 in Fig. 13. These screws maintain the double-heading valve assembled so that it may be applied and removed as a unit. The valve is held in place on the pedestal 22 by four machine screws 83 (see Fig. 7) which pass through the cap 79 and seat member 42 and are threaded into the pedestal.

The rotary valve 76 is provided on its back with converging wings 84 (see Fig. 16) which receive a tapered key 85 on a rotary stem 86 journaled in the cap portion 79. A gasket 87 seals the joint with the cap, and a coiled compression spring 88 holds the gasket under pressure and urges the rotary valve 76 toward its seat. This construction will be recognized as essentially similar to that used to turn the rotary valve of engineer's brake valves.

A handle 89 is fixed on the rotary stem 86 in a familiar manner and carries in its hollow handle a longitudinally slidable latch member 91 which is urged radially inward by a coil spring 92 and which has a trigger 93 extending through the front face of the handle at about midlength of the handle in a convenient position for retraction of the latch.

The nose 94 of the latch 91 coacts with a sector 95 mounted on the top of the cap portion 79. For the actual construction of this sector, see Fig. 7. The handle is shown in position 1 where the latch nose 94 is against a lug 96 which defines position 1 of the handle, but does not restrain its motion toward position 2. In position 2, the latch nose 94 enters a shallow notch 97 so as to retain the handle 89 in position 2. To move the handle to position 3, the latch must be manually retracted. In position 3, the handle is retained by a notch 98. Thus the handle remains in position 1 by gravity, may be moved to position 2 without disengaging the latch, is impositively retained in position 2 against return to position 1, but is positively engaged against motion back and forth between position 2 and position 3.

Figures 8, 9:
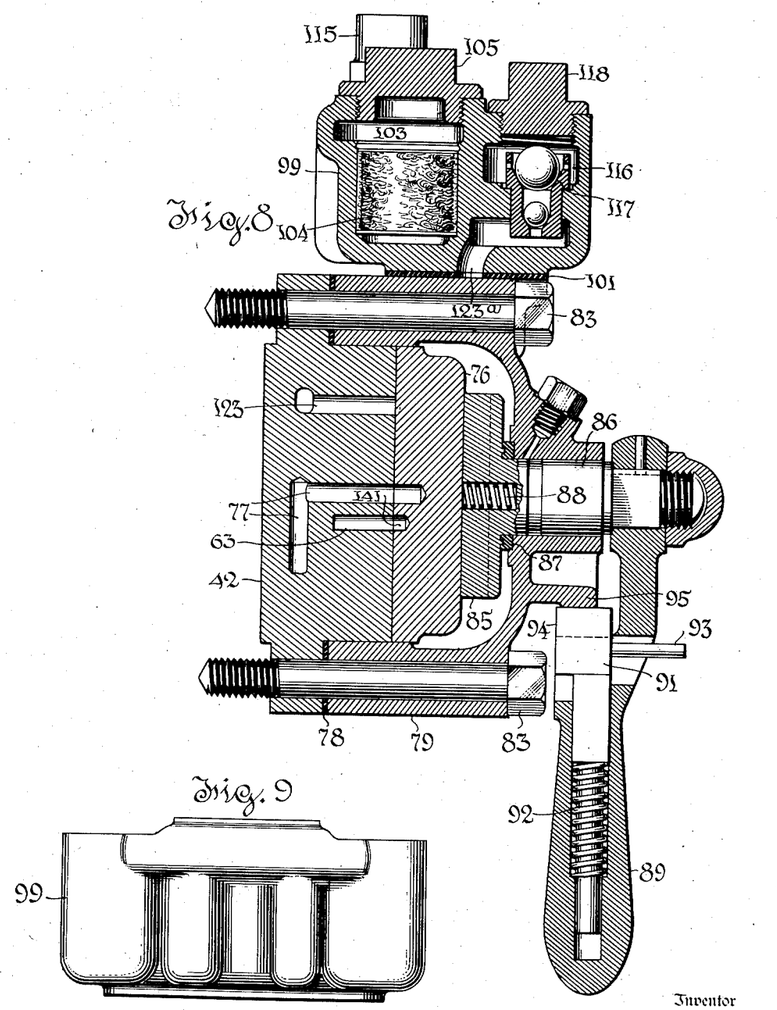
Fig. 8 is a section on the line 8—8 of Fig. 7.
Fig. 9 is a rear elevation of the check valve case of the dead engine fixture shown in Fig. 7.
Figures 10, 11, 12:
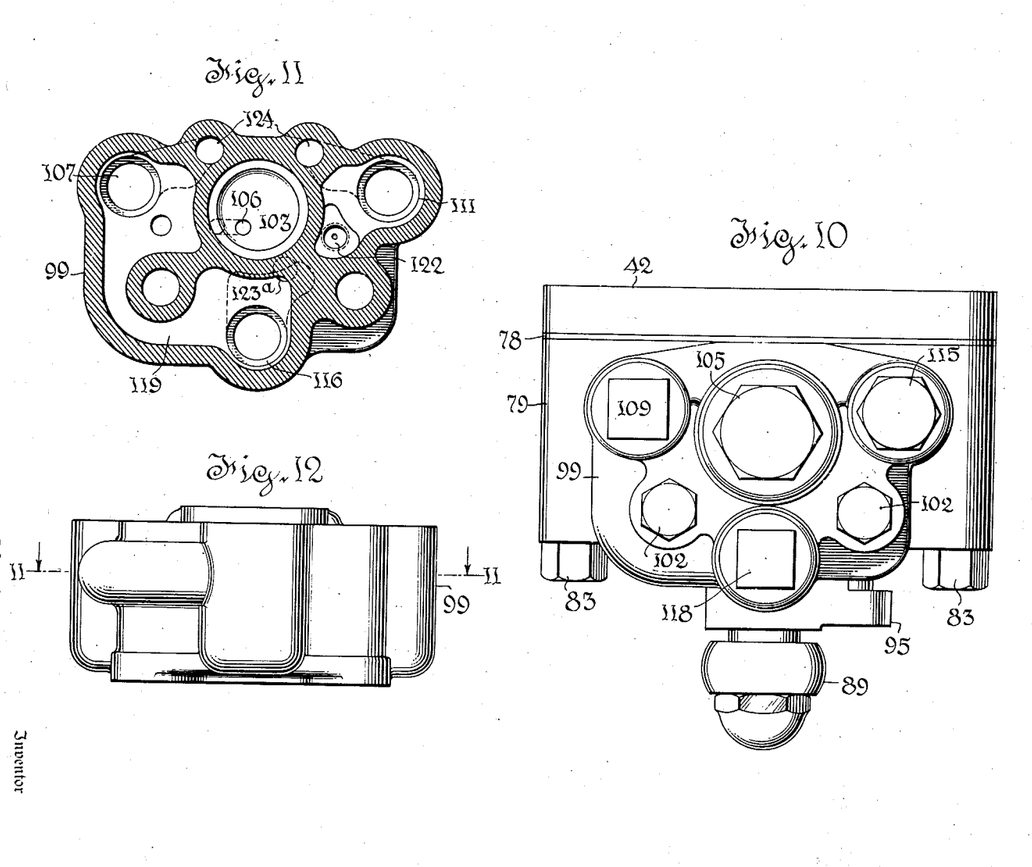
Fig. 10 is a plan view of the valve shown in Fig. 7.
Fig. 11 is a section on the line 11—11 of Fig. 12.
Fig. 12 is a front elevation of the check valve case of the dead engine fixture shown in Fig. 7.

Mounted on top of cap member 79 is a check valve and strainer case 99. A gasket 101 is interposed and the case is held on the cap by two machine screws 102 (see Fig. 10) which pass through holes in the case (see Fig. 11). In this case is a filter chamber 103 in which is mounted a curled hair filter 104 of cartridge form. The filter chamber is closed by a removable closure cap 105 which is screwed into the open upper end of the chamber (see Fig. 8). A passage 106 leads from port 43 to the lower (entrance) end of the chamber 103 and is formed partly in the seat member 42 and partly in the cap member 79.

Located adjacent the filter chamber 103 are three chambers containing corresponding check valves. The first chamber 107 contains the brake pipe check 108, here shown as consisting of two ball checks in series, the purpose in using a double ball check being to insure a seal at one ball valve in the event that the other should be unseated by dust or grit. The chamber 107 is closed at its open upper end by a screw plug 109.

The dead engine reservoir feed check is mounted in chamber 111 and comprises a double ball check 112, the upper ball of which is loaded by a coil spring 113. This spring is confined between a cup-like plunger 114 and the threaded cap 115 which closes the upper end of the chamber 11 (see Fig. 7).

Chamber 116 contains a double ball check 117 and is closed by the screw plug 118.

The upper ends of the chambers 107 and 116 are both connected by a passage 119 to port 121 in the face of seat member 42. The upper end of chamber 111 is connected through choke 122 with the port 123 terminating in the seat face of member 42. There is a branch of the passage 123 indicated at 123a which leads to the lower side of the check valve 117. The space in chamber 103 above the filter 104 communicates by passage 124 with the lower ends of the check valves 108 and 112.

The actual positions on the face of seat member 42 of the ports 43, 48, 62, 63, 52, 46, 77, 121, and 123 are clearly indicated in Fig. 13. It will be observed that ports 43 and 46 which accommodate the main flow between the engineer's brake valve and brake pipe are arcuate ports of large capacity. The port 52 terminates in an arcuate extension. In addition there is formed a groove 125 in the face of the valve seat which is adjacent the port 121 and of the same radial dimensions.

Figure 16:
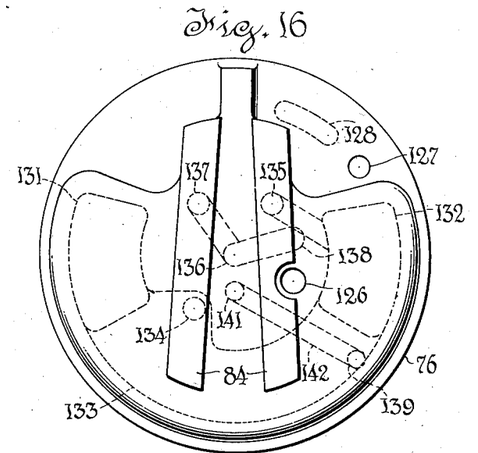
Fig. 16 is a view of the back (inactive face) of the disc valve.
Figure 17:
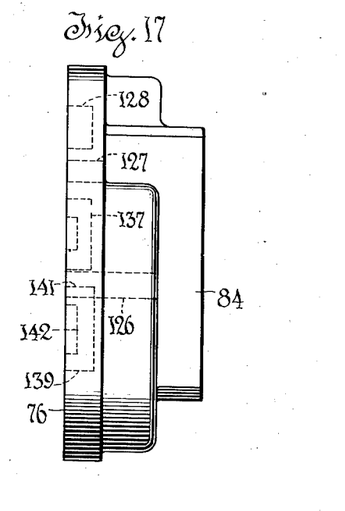
Fig. 17 is a side elevation of the disc valve.
Figure 18:
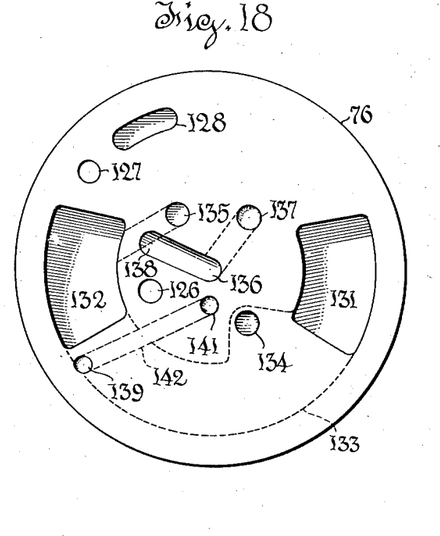
Fig. 18 is a face view thereof.
Figure 19:
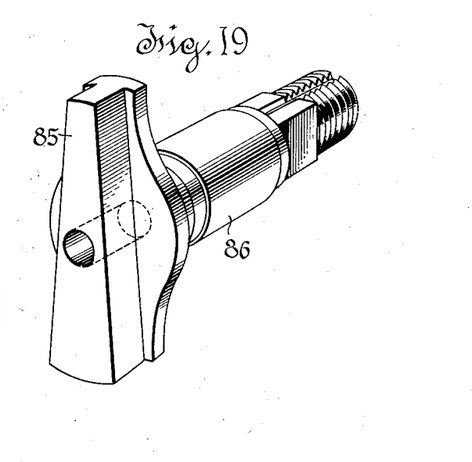
Fig. 19 is a perspective view of the actuating stem and key.

The porting of the rotary valve 76 can now be described with reference to Figs. 16, 17 and 18. There is a port drilled through the valve as indicated at 126. In position 1 this port feeds main reservoir air from port 52 to the space at the back of the rotary valve 76 (see Fig. 4). There is a second through port 127 which is adjacent a groove 128 formed in the face of the rotary valve 76. The groove 128 is arcuate in form and of the same radial dimensions as port 127. In position 3, port 127 registers with port 121, establishing connection to the space at the back of the rotary valve 76. This is diagrammatically indicated in Fig. 6. In position 2, port 127 in the valve registers with groove 125 in the seat, port 121 in the seat registers with groove 128 in the valve, and the grooves 125 and 128 overlap. In this manner port 121 is placed in communication with the space above the rotary valve 76. This is indicated arbitrarily in diagram in Fig. 5 by the port 127a.

In the face of the valve 76 are two ports 131 and 132 so positioned and dimensioned as to register simultaneously with the ports 43 and 46, respectively, in position 1. The ports 131 and 132 are connected by a cored passage 133 formed within the body of the rotary valve 76 (indicated in dotted lines in Fig. 16), and a port 134 leads through the face of the valve into the passage 133.

The port 134 is so located as to communicate with the main reservoir port 52 in positions 2 and 3, the arcuate length of the port 52 being sufficient for this purpose. Furthermore, the port 135 in the face of the rotary valve 76 leads to the port 132, and consequently to the passage 133. Port 135 is so positioned as to register with the transfer valve port 48 in position 2.

Registering with the exhaust port 77 on the seat is a central exhaust port 136 in the valve 76. This communicates by passages internal to the valve 76 with port 137 in the face of rotary valve 76 which registers with transfer port 48 in position 1 and port 138 which registers with transfer port 48 in position 3. These connections are diagrammatically illustrated in Figs. 4 and 6, respectively.

In the face of the valve there are two ports 139 and 141 connected by an internal passage 142. These serve to connect the ports 62 and 63 in position 1. The connection is indicated by the numeral 142 in Fig. 4. The connections in the three positions can now be recapitulated.

*Position 1.*—The brake pipe port 43 is connected with brake valve port 46 by way of the ports 131, 133, 132 in the rotary valve 76. The transfer valve port 48 is connected to the exhaust port 77 by way of the ports 137, 136 in the rotary valve. The signal pipe 62 is connected to the feed valve connection 63 by the ports 139, 142, 141 in the rotary valve. The main reservoir port 52 is connected with the space above the rotary valve 76 by the through port 126 in the rotary valve.

*Position 2.*—Communication between the brake pipe port 43 and the brake valve port 46 is interrupted. The transfer passage 48 is disconnected from the exhaust and is connected with the main reservoir. This is brought about as follows: Port 134 registers with port 52, and port 135 registers with port 48. As ports 134 and 135 both communicate with passage 133 in the rotary valve, the effect is to connect the main reservoir port with the transfer port. Communication is interrupted between the signal pipe 62 and the signal reducing valve connection 63. The main reservoir is connected to the space above the rotary valve 76 as follows: Port 134 registers with port 52 so that passage 133 is at main reservoir pressure. In position 2, port 132 overlies port 123 in the seat so that main reservoir air flows through the port 123 past the check valve 117 and through passage 119 and port 121 to the seat of the rotary valve. In this position, port 121 registers with groove 128 in the rotary valve which overlaps groove 125 in the seat, while groove 125 registers with port 127 through the rotary valve. This connection is, as already stated, diagrammatically illustrated in Fig. 5 by a single port designated 127a.

If main reservoir pressure is below brake pipe pressure and the valve 76 is in position 2, brake pipe air would flow from passage 43, through passage 106, strainer 104, check valve 108 to the port 121, so that the valve 76 would then be held seated by the maximum pressure in the system, i. e., brake pipe pressure.

Position 2 is used at the rear end of the leading locomotive and at both ends of a second live unit when double-heading. Under these conditions, main reservoir pressure is the dominant pressure. Position 2 is, however, used on one of the pedestals of an engine hauled dead in a train, and on such an engine, brake pipe pressure is higher than main reservoir pressure. Consequently, it is necessary to provide in position 2 for the admission to the top of the rotary valve of whichever of the two pressures is predominant. The two check valves permit flow to the space above the rotary valve from either source, but close against back flow to the source, so that there is no danger of connecting the brake pipe directly with the main reservoir. The importance of guarding against this possibility is one of the reasons for using the dual check valves here illustrated.

In position 2, brake pipe pressure may, if dominant, flow to the main reservoir as follows: Port 43, port 106, strainer 104, loaded check 112, choke 122, port 123, ports 132, 133, 134 to port 52.

*Position 3.*—Position 3 is used on only one end of an engine hauled dead in a train. In this position the brake pipe port 43 and brake valve port 46 are disconnected. The transfer port 48 is connected to atmosphere by way of ports 138, 136 and 77. The signal pipe port 62 and the reducing valve port 63 are disconnected. The brake pipe port 43 is always connected by passage 106 and strainer 104 with the lower or entrance sides of the check valves 108 and 112. Hence, brake pipe air flows freely past check valve 108 to port 121 which, in position 3, registers directly with the through port 127 in the rotary valve. Consequently, when the double-heading valve is set in position 3, the space above the rotary valve 76 is immediately charged to brake pipe pressure.

When the third position is being used, the brake pipe pressure exceeds main reservoir pressure, for the reason that the engine being dead, it is necessary to feed the main reservoir of the dead engine from the brake pipe of the train. This feeding flow occurs as follows: From the brake pipe port 43 through passage 106, strainer 104 up through loaded check valve 112, through choke 122, passage 123, ports 132, 133 and 134 in the rotary valve, to the main reservoir port 52. In this way, the main reservoir is charged from the brake pipe to a pressure somewhat less than brake pipe pressure.

The pressure reduction is determined by the strength of the spring 113 and the reduction is customarily twenty pounds per square inch. The compressed air thus stored in the main reservoir is admitted to the engine brake cylinders under the control of the distributing valves on the dead engine.

Figure 1:
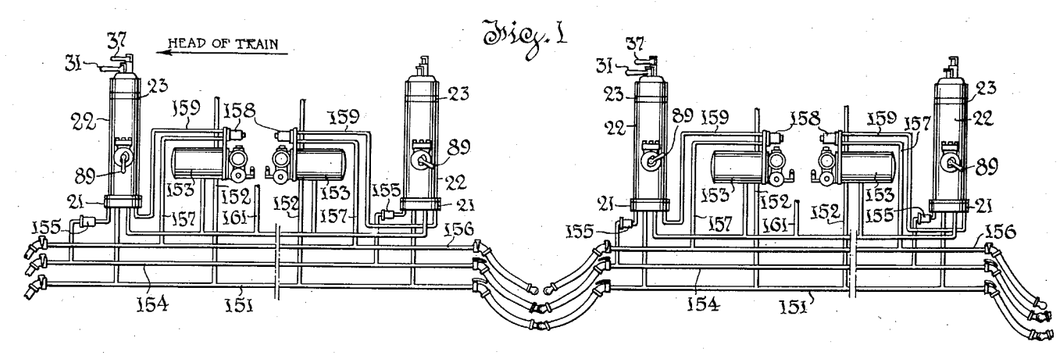
Fig. 1 is a piping diagram of two connected double end locomotives, the first live and the second being hauled dead.
Figure 2:
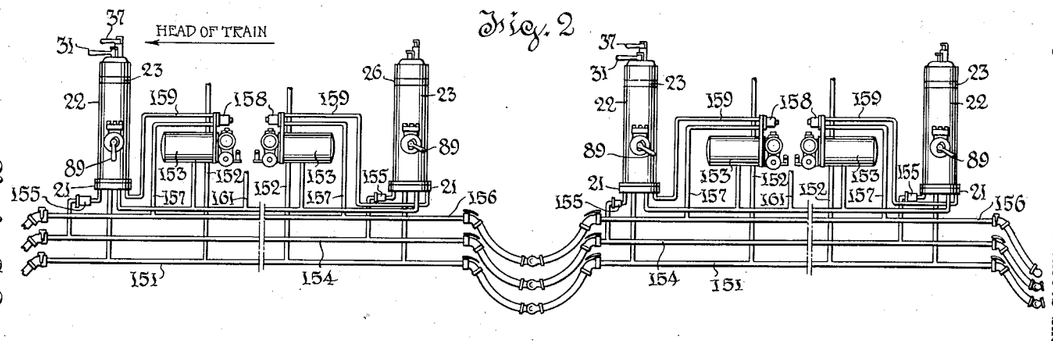
Fig. 2 is a similar diagram showing double-heading (both locomotives live).

The general manner of setting the valves can now be explained with reference to Figs. 1 and 2. In these figures, two connected locomotives are supposed to be proceeding to the left, so that the left hand engine is the leading engine in each case. In Fig. 1, the second engine is supposed to be hauled dead. In Fig. 2, both engines are live, and in condition for double-heading.

The brake pipe is illustrated at 151 and is connected to the passages 43 of the two pedestals on each locomotive. It is also connected, as indicated at 152, with the equalizing portion of the distributing valves 153. The brake pipes are connected from locomotive to locomotive and to the train by the usual hose connections with angle cocks, as indicated in the drawings.

The signal pipe is indicated at 154 and is connected to the signal passage 62 of each pedestal through check valve-strainer units 155, there being one such unit for each pedestal. The signal pipes are connected between locomotives and throughout the train by flexible hose connections as usual. Angle cocks are used. The signal valve and whistle connections are omitted from the drawings.

The equalizing pipe is shown at 156. It has connections 157 to each transfer valve 158, there being one transfer valve associated with each of the distributing valves 153. The equalizing pipes are connected from engine to engine by flexible hose with angle cocks, as shown. No equalizing pipe is used on cars. Where the second engine is dead, as in Fig. 1, it is unnecessary to make the equalizing pipe connection because the brakes on the second locomotive are operated solely from the brake pipe. Hence, in Fig. 1, the hose couplings are shown disconnected and the angle cocks closed.

There is a pipe connection 159 from the transfer passage 48 of each pedestal to the corresponding transfer valve 158. Main reservoir pipe 161, leading from the main reservoir on each locomotive (not shown) connects with the main reservoir port 52 of each pedestal on that locomotive. The double-heading valves on the various pedestals are indicated by the numeral 89 and applied to the handle.

Assume that the left hand locomotive in Fig. 1 is operating as a single unit. In such case, the handles 31 and 37 are on the leading pedestal, as shown. The double-heading valve on that pedestal is in position 1, and on the rear pedestal the double-heading valve is in position 2 and the handles are removed from the brake valves, leaving the independent brake valve in running position and the engineer's brake valve in lap position.

Referring again to Fig. 1, and assuming that the leading engine is drawing a second engine dead in a train, conditions would be the same as just described, except that on the rear pedestal both the brake valve handles should be removed, leaving the valves in lap position. On the second engine the leading pedestal has the engineer's brake valve and independent valve, both in running position, and the double-heading cock in position 3. On the rear pedestal of the dead locomotive, both the engineer's brake valve and the independent brake valve handles are removed, leaving the engineer's brake valve in lap position, the independent brake valve in running position, and the double-heading cock is in position 2.

Referring now to Fig. 2, which shows the double-headed connection; in the leading engine, the brake valve handles are on the leading pedestal and the double-heading cock on the leading pedestal is in position 1. On the rear pedestal the engineer's brake valve and the independent brake valve handles are removed, leaving the engineer's brake valve in lap position, and the independent valve in running position. The double-heading valve is in position 2. The same is true of the rear pedestal of the second locomotive. On the leading pedestal of the second locomotive, the double-heading valve is also in position 2, but it is advisable to carry the engineer's brake valve in lap position and the independent brake valve in running position, so that the engineer can make partial releases to relieve over-applications and prevent heating of the tires.

The operation of the mechanism above described is too well known to require elaborate explanation. It may be said that the transfer valve is rendered active to shift control to the opposite end of the locomotive if it be subjected to pressure and becomes inert or inactive if vented to atmosphere.

In double-heading cocks as heretofore constructed there was no control of the signal line by the double-heading cock. The signal fixture was external to the pedestal and comprised a stop valve, a check valve, and a strainer. The incorporation of the signal valve as a part of or in close mechanical association with the double-heading valve results in correct setting of the signal system as an incident to the adjustment of the double-heading cock, and avoids the danger of overfeeding the signal line. This would occur if more than one fixture were left in feeding position.

In prior practice the dead engine fixture also was external to the double-heading cock and comprised a stop valve, a loaded check valve and a strainer. The addition of the valve function and the inclusion of the check valve and strainer as a part of the double-heading cock structure greatly simplifies manipulation and provides a much simpler and better device. Incidentally, there is increased accessibility as compared to the arrangements heretofore used.

The double-heading cock heretofore used on pedestals for double end service was of the rotary plug type and controlled merely the connection between the brake pipe and the brake valve and the admission and exhaust of pressure to and from the transfer valve. With devices of this character, difficulty has been experienced in keeping the cock tight. To avoid this difficulty, recourse is had in the present structure to a disc valve. The reversal of pressure differential between the main reservoir and the brake pipe made it difficult to insure a proper seating pressure on the rotary valve, and an important feature of the present invention is the use of ports controlled by the rotary valve in conjunction with check valves to insure that the maximum pressure available at the seat of the valve is admitted over the outer face of the valve to maintain this seated.

A double-heading cock including the dead engine fixture as disclosed in this application can be substituted for the plug cocks heretofore in general use. To do this, the existing plug cock is removed from the V-shaped seat in which it is customarily mounted and a ported adapter is mounted against said seat. This adapter is provided with a ported face against which the valve seat member 42 is bolted exactly as it is bolted against the pedestal 22 in the present disclosure. This simple expedient permits the substitution of the present mechanism for existing valves, and has the effect of incorporating the dead engine fixture as a part of the double-heading cock. It does not, however, give control of the signal system for the reason that in existing prior art installations, so far as is known, the reducing valve port and the signal port were not carried to the mounting for the double-heading cock. Where the cock of the present invention is substituted in old installations, as above suggested, the external dead engine fixture is removed.

The multiple ported valve here disclosed is in effect four valves mechanically connected to operate in timed relation. There are thus combined for conjoint operation a cutout cock, a valve for transfer valve operation, the valve of a signal fixture, and the valve of a dead engine fixture. Obviously such conjoint operation can be secured in various ways, but the use of a single valve with multiple porting is deemed simplest and best.

Obviously there are various types of pedestal designed for different classes of service and certain types of service will not require all the features disclosed in the present application. It is within the scope of the present invention to apply the cock in such cases with such features as are necessary to the class of service and such use of the invention is contemplated. Moreover, certain features of the valve can be incorporated in types of valve other than the disc valve here shown. Various different types of check valve might be substituted and might be variously arranged. While the particular porting of the rotary valve 76 has been successful in practice and is preferred, equivalent results might be secured by specifically different arrangements of ports, and such modifications fall within the scope of the invention.

For the above reasons, I do not desire to be limited to the specific structure illustrated, except to the extent specified in the claims.

What is claimed is,—

1. The combination of an air brake system including an engineer's brake valve and a brake pipe; a signal system including a feed valve and a signal pipe; and a single double-heading valve controlling communication between the brake valve and brake pipe and between the feed valve and the signal pipe.

2. The combination of claim 1, further characterized in that such communications are both established in one setting of the double-heading valve and interrupted in another.

3. The combination of an air brake system including an engineer's brake valve, a brake pipe and a distributing valve with transfer valve; a signal system including a feed valve and a signal pipe; and a single double-heading valve controlling communication between the brake valve and brake pipe and between the feed valve and signal pipe, and controlling the transfer valve to render the same selectively active and inactive.

4. The combination of claim 3, further characterized in that in one position of the double-heading valve both communications are established and the transfer valve is rendered inactive, and in a second position of the double-heading valve both communications are interrupted and the transfer valve is rendered active.

5. The combination of claim 3, further characterized in that in one position of the double-heading valve both communications are established and the transfer valve is rendered inactive, in a second position of the double-heading valve both communications are interrupted and the transfer valve is rendered active, and in a third position both communications are interrupted and the transfer valve is rendered inactive.

6. The combination of an air brake system including an engineer's brake valve, main reservoir, brake pipe, and distributing valve with transfer valve; a single double-heading valve controlling comunication between the brake pipe and the engineer's brake valve, and communication between the brake pipe and the main reservoir, said double-heading valve controlling said transfer valve to render the same active or inactive selectively, said double-heading valve having three positions in the first of which positions it establishes the first communication, interrupts the second communication, and renders the transfer valve inactive, in the second of which it interrupts the first and establishes the second communication and renders the transfer valve active, and in the third of which it interrupts the first and establishes the second communication and renders the transfer valve inactive; and pressure reducing valve means interposed in said second communication controlling flow from the brake pipe to main reservoir and closing against reverse flow.

7. The combination of claim 6 further characterized in that the double-heading valve is of the rotary type enclosed within a casing in which fluid pressure acts upon the valve to urge the same against its seat, and in that the valve and seat contain ports which in the first position admit main reservoir pressure to said casing, and ports which in the second and third positions connect said casing with both main reservoir and brake pipe, there being check valves in the last-named ports preventing back flow from the casing to main reservoir and to brake pipe.

8. The combination of an air brake system including an engineer's brake valve, main reservoir, brake pipe, and distributing valve with transfer valve; a signal system including a feed valve and a signal pipe; a single double-heading valve controlling communication between the brake pipe and the engineer's brake valve, communication between the brake pipe and the main reservoir, and communication between the signal pipe and the feed valve, said double-heading valve controlling said transfer valve to render the same active or inactive selectively, and having three positions, in the first of which positions it establishes the first and third communications, interrupts the second and renders the transfer valve inactive, in the second of which positions it interrupts the first and third and establishes the second communication and renders the transfer valve active, and in the third of which positions it interrupts the first and third and establishes the second communication and renders the transfer valve inactive; and pressure reducing valve means interposed in said second communication, controlling flow from the brake pipe to the main reservoir and closing against reverse flow.

9. The combination with an air brake system, and an associated pneumatic signal system, of a double-heading device including a valve; a signal control device including a valve; and means for actuating said valves in definite timed relation.

10. The combination with an air brake system and an associated pneumatic signal system of a double-heading device including a valve; a dead engine device including a valve; a signal control device including a valve; and means for actuating said valves in definite timed relation.

11. The combination with a brake valve and pedestal of the type used in double end service, of a single valve controlling ports in said pedestal, and controlling connection between the brake valve and the brake pipe port, and a feeding connection from the brake pipe port to the main reservoir port, and serving to open said connections selectively.

12. The combination with a brake valve and pedestal of the type used in double end service and including a signal port and feed valve therefor, of a single valve controlling ports in said pedestal and performing in timed relation the functions of a double-heading cock, dead engine fixture, and signal fixture.

13. In a combined double-heading valve and dead engine fixture, the combination of a valve seat; a valve coacting therewith and rotatable to assume a plurality of different positions, in one of which brake pipe air is fed to the main reservoir; and means controlled by said valve for admitting brake pipe air to act on said valve in a seating direction when the valve is in the named position, and for admitting main reservoir air so to act on said valve in another position.

14. In a combined double-heading valve and dead engine fixture, the combination of a valve seat having brake pipe and main reservoir ports; a valve rotatable on said seat to control said ports and having different positions in which the pressure differential between said ports is reversed; and means controlled by said valve for admitting to the top of the valve, to seat the same, pressure fluid from that port which is at the higher pressure.

15. The combination of claim 14 in which the last-named means comprises a plurality of ports in said valve and seat, and check valves controlling flow through said ports and precluding flow toward said main reservoir and brake pipe ports.

16. The combination of a main reservoir; a brake pipe; an engineer's brake valve connected therewith to control pressure in the brake pipe; a double heading cock interposed in and controlling the connection between the brake valve and brake pipe, said double heading cock having at least two positions, the first of which is adapted for use when main reservoir pressure predominates over brake pipe pressure, and another of which is adapted for use when either of said pressures may at times predominate; means comprising ports controlled by said cock and opened thereby in different positions to admit the predominant pressure to act on the cock and hold the same seated; and check valves in certain of said ports serving to prevent free flow in each direction between main reservoir and brake pipe.

17. The combination of a main reservoir; a brake pipe; an engineer's brake valve connected therewith to control pressure in the brake pipe; a double heading cock interposed in and controlling the connection between the brake valve and brake pipe, said double heading cock having at least two positions, the first of which is adapted for use when main reservoir pressure predominates over brake pipe pressure, and another of which is adapted for use when either of said pressures may at times predominate; means comprising a port opened by said double heading cock in such other position and pressure reducing one-way flow valve means in said port for permitting flow from the brake pipe to the main reservoir when pressure in the former predominates and closing against reverse flow; means comprising ports controlled by said cock and opened thereby in different positions to admit the predominant pressure to act on the cock and hold the same seated; and check valves in certain of the last-named ports serving to prevent free flow in each direction between main reservoir and brake pipe.

18. The combination of claim 8 further characterized in that the double-heading valve is of the rotary type enclosed within a casing in which fluid pressure acts upon the valve to urge the same against its seat, and in that the valve and seat contain ports which in the first position admit main reservoir pressure to said casing, and ports which in the second and third positions connect said casing with both main reservoir and brake pipe, there being check valves in the last-named ports preventing back flow from the casing to main reservoir and to brake pipe.

19. In an automatic air brake system, the combination of a three position double heading cock adapted to connect a brake valve with a brake pipe in one position and to disconnect it therefrom in two other positions; and means including ports with check valves for admitting brake pipe pressure and main reservoir pressure to act on said cock to seat the same while precluding free communication in each direction between brake pipe and main reservoir, said ports being controlled by said double heading cock and closed thereby in said first position and opened thereby in said other positions.

20. The combination with an automatic air brake system including an engineer's brake valve and a brake pipe and a signal system including a feed valve and a signal pipe of a three position double heading cock mechanism interposed between the brake valve and the brake pipe and between the feed valve and the signal pipe, said cock mechanism serving in one position to connect the brake valve with the brake pipe and the feed valve with the signal pipe, and in both other positions to interrupt both said connections.

CHARLES A. CAMPBELL.